J. S. MANTON.
CLUTCH CONTROLLER.
APPLICATION FILED NOV. 15, 1915.
1,310,199.
Patented July 15, 1919.
2 SHEETS—SHEET 2.
Fig. 4
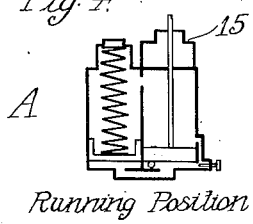
A
Running Position
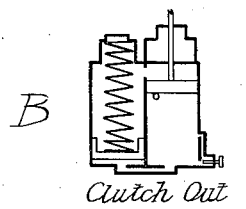
B
Clutch Out
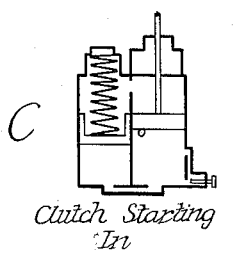
C
Clutch Starting In
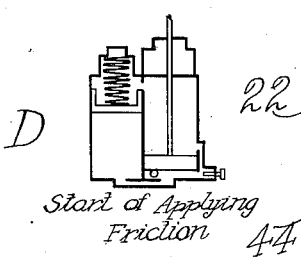
D
Start of Applying Friction
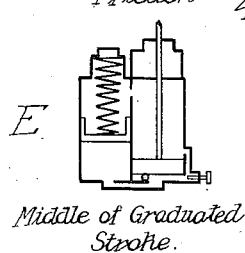
E
Middle of Graduated Stroke.
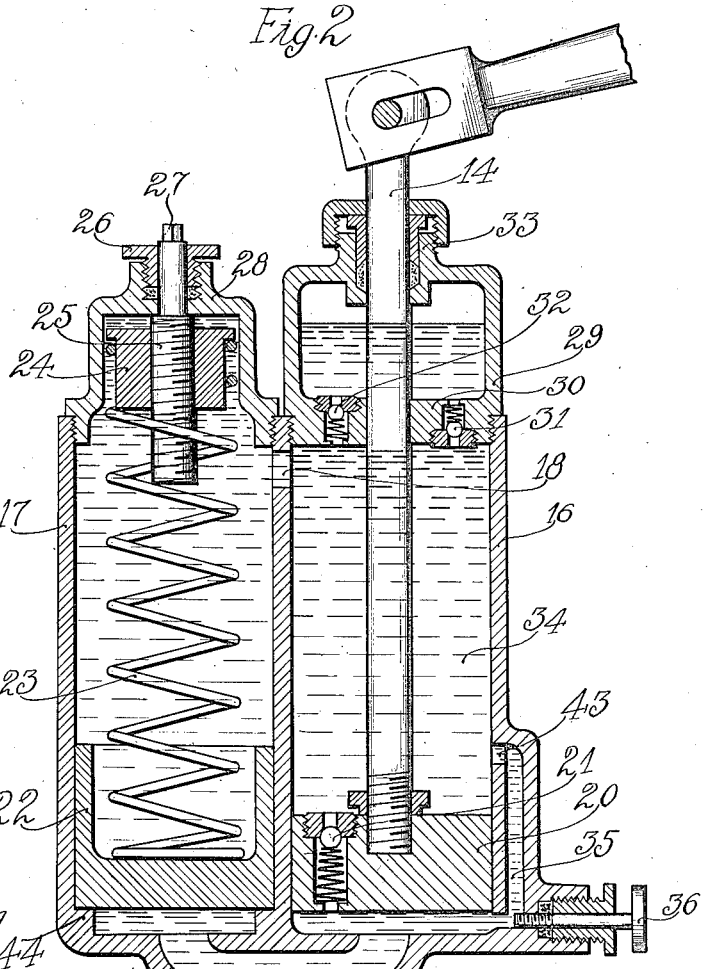
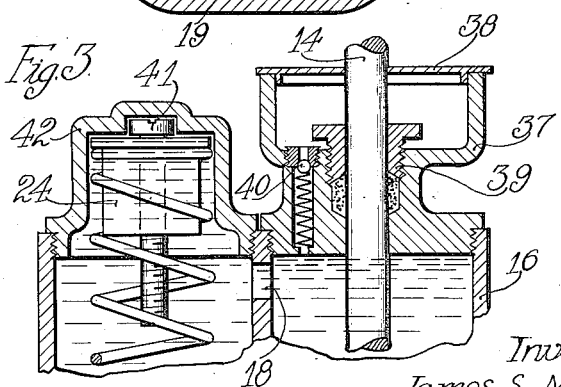
Inventor
James S. Manton
By Crown, Hanson & Boettcher
Attorneys.

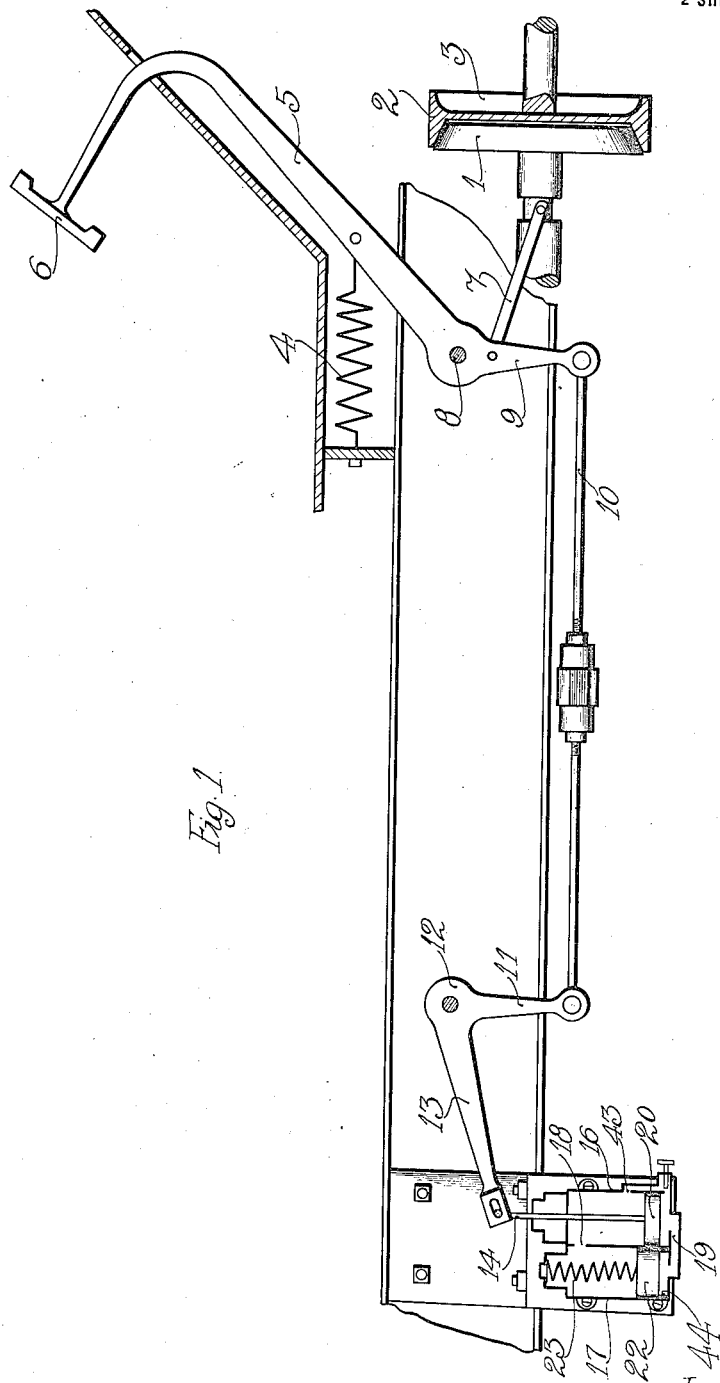

UNITED STATES PATENT OFFICE.

JAMES S. MANTON, OF CHICAGO, ILLINOIS.

CLUTCH-CONTROLLER.

1,310,199.          Specification of Letters Patent.      Patented July 15, 1919.

Application filed November 15, 1915. Serial No. 61,483.

*To all whom it may concern:*

Be it known that I, JAMES S. MANTON, a citizen of the United States, residing at Chicago, in the county of Cook and State of Illinois, have invented a certain new and useful Improvement in Clutch-Controllers, of which the following is a full, clear, concise, and exact description, reference being had to the accompanying drawings, forming a part of this specification.

My invention relates to clutch controllers for controlling the engagement of clutches for automobiles and the like.

It is customary, especially where internal combustion engines are employed as motive power, to disengage the engine from the driving wheel by a friction clutch of some type. In operating the vehicle, especially under difficult traffic conditions, it is often necessary to slip the clutch and to reëngage the same quickly, and my invention is designed to provide a controller which will allow of quick disengagement and reëngagement in a minimum time with the least possible shock.

In the accompanying drawings I have illustrated one embodiment of my invention.

Figure 1 is a diagrammatic elevational view of the controller and clutch mechanism;

Fig. 2 is a vertical cross section of the controller;

Fig. 3 is a section of a modification; and

Fig. 4 is a series of diagrams—A, B, C, D, and E, illustrating the operation of the controller.

According to my invention, a controller spring is employed to balance the main operating spring of the clutch. These two springs are made to oppose each other through a liquid dashpot interposed between them. The adjustment is such that at the point of the engagement of the clutch members, these two springs will completely counter-balance or neutralize each other, and the collapse of resistance of the liquid dashpot gradually eliminates the effect of the balancing spring, and allows the main operating spring to apply suitable pressure to the clutch members to cause engagement of the same.

The cone 1 of the friction clutch 2 normally engages the member 3, being held in place by the tension of the main operating spring 4. A lever 5, bearing a pedal 6 serves to move the cone 1 into and out of engagement with its coöperating clutch member. This is accomplished by means of a suitable arm 7 pivoted to the lever 5 below the main mounting pivot 8. An extension 9 of the lever 5 extends below the main operating pivot 8 and has secured thereto an adjustable rod 10. The rod 10 is connected to an arm 11 of a bell crank lever 12, the other arm 13 of which is connected to the plunger rod 14 of the controlling cylinder.

The controller 15 comprises two cylinders, 16 and 17, having communicating passages 18 and 19 between them. A piston 20 is secured to the end of the rod 14 and fits closely within the walls of the cylinder 16. A valve 21 allows of rapid upward movement of the piston 20 within the cylinder 16, that is in the direction to disengage the clutch, but prevents the escape of liquid therethrough in the other direction. A piston 22 fits closely in the cylinder 17 and a spring 23 tends to press this piston normally to the bottom of the cylinder 17. An adjustable nut 24 is threaded on the end of the stud 25 and may be moved up and down by rotation of the stud 25 to adjust the tension of the spring 23. The top of the stud 25 is reduced in diameter and projects through a stuffing box 26, being provided with a squared end 27 for suitable engagement by a wrench or the like. The cap 28 which holds the stuffing box 26, closes off the top of the cylinder 17. The top of the cylinder 16 is closed off by a hollow cap 29 which has a bottom wall 30 containing the valves 31 and 32. These valves face in opposite directions to allow of a slight "breathing" of the oil due to the movement of the piston rod 14. The hollow cap 29 is closed off by the stuffing box 33 which prevents the escape of the liquid along the side of the piston rod 14. The interior of the cylinders 16 and 17 is preferably filled with oil 34. A by-pass 35 around the piston 20 allows the oil to escape around the piston, as will be described later.

A valve 36 controls the speed of by-passing the oil.

In Fig. 3 I have shown a modification in this form of the device. The hollow cap is dispensed with and an open cap 37 is provided instead. This open cap is closed by cover 38 and a stuffing box 39 keeps the oil from leaking out along the rod 14. A valve 40 allows oil to be introduced to the cylinder 16 to replenish leakage and the like. A different form of spring adjustment is also provided. In this case the threaded nut 24 is screwed on the headed bolt 41 and the entire adjustment inclosed within the cylinder by means of the cap 42.

The operation of the device is as follows:

When the clutch 2 is disengaged by movement of the pedal 6 downward, the spring 4 which is the operating spring for the clutch, is placed under tension, the bell crank lever 12 is swung about its pivot and the piston 20 is raised, as shown in diagram B of Fig. 4. When the operator now desires to reëngage the clutch, the pedal 6 may be entirely released. The spring 4 swings the lever 5, which carries the pedal 6, about the pivot 8 in a counter-clockwise direction so as to bring the cone 1 of the clutch toward the coöperating portion 3. This movement thrusts the piston 20 downward in the cylinder 16, as will be seen in diagram C of Fig. 4. The adjustment of the parts is such, that just as the cone 1 is engaging its coöperating portion 3, the piston 20 comes to normal position thereby uncovering the port 43 of the by-pass 35, as shown in D of Fig. 4. At this point, the spring 23, which is compressed by the upward movement of the piston 22, offers sufficient resistance to substantially equalize the effect of the spring 4. But uncovering of the port 43 allows the oil to by-pass around the piston 20 so that the spring 23 expands and finally returns the piston 22 to its seat 44. As it expands, the pressure upon the piston 20 is relaxed and the pull of the spring 4 finally presses the cone 1 firmly into engagement with the coöperating clutch surface 3. By thus applying the pressure gradually, the clutch takes hold smoothly so that shocks and sudden strains upon the mechanism are avoided. In the normal position, as shown in Fig. 2 and as shown in diagram A, the oil is completely by-passed around the piston 20 and the pressures upon both sides of the piston 20 are substantially equal.

Due to the adjustment of the device, the clutch member 1 moves up into a position where the surfaces are in engagement without sufficient pressure to cause operation of the clutch. At this point, the tension of the spring 4, that is the clutch operating spring, is neutralized by the effect of the spring 23. Thereafter pressure upon the clutch member is exercised gradually, but surely, and at the end of the operation, the clutch is firmly in engagement under the entire tension of the spring 4. The speed with which the pressure is applied may be controlled by the adjusting screw 36 in the by-pass. It is apparent that by varying the area of the pistons 20 and 22, different strengths of spring and different characteristics of operation may be employed.

I am aware that heretofore in the art numerous checking devices have been proposed, but I wish it distinctly understood that my device has nothing in common with these. The prior art devices with few exceptions usually consist of dash-pot mechanism which begins to materially check the motion of the movable clutch member as soon as the movable clutch member starts toward the stationary clutch member. There is a distinct disadvantage in using such a device in that the movement of the movable member toward the stationary member is slower than necessary and the controller cannot bring the two surfaces into engagement without a shock. That is to say, under the constructions of the prior art referred to the movement of the movable member will be checked while it is advancing toward engagement with the stationary member and when it engages the stationary member, it does so with sufficient force to create a decided shock. The application of pressure thereafter is at the same rate that the movable member moves toward the stationary members before they are in engagement.

My device on the contrary is so arranged that the checking spring does not materially retard the speed of operation caused by the main spring until the two clutch members begin to engage, the parts being so calibrated that the action of the checking spring does not materially retard the speed of inward movement of the movable clutch member until said spring becomes compressed to a certain predetermined tension. At this point, however, the checking material action begins due to the compression of the spring 23. The surfaces come into engagement and pressure is applied gradually thereafter with such smoothness that no shock is perceptible. I consider my invention to be broadly new and conceive that the same embodies a new method of operation which consists broadly in applying a force to the movable member tending to drive it into engagement with the stationary member, then creating a force which will substantially neutralize the first force just at the point of engagement of the surfaces and then gradually eliminating the effect of the second force so that the first force can act again to apply pressure to the coöperating surfaces.

I do not desire to be limited to the precise details shown, as a number of modifications will at once suggest themselves to those skilled in the art. I desire that the appended claims be construed with all due liberality in view of the prior art.

What I claim is:

1. In combination, a clutch having a relatively movable member to be pressed into engagement with another member, a lever for moving said movable member, spring means tending to press said movable member into engagement with said other member, spring means for opposing said first spring means and for equalizing the same when said first clutch member is about to engage said other clutch member, a liquid dashpot between said first spring means and said second spring means, and means to release first said spring means.

2. In combination, a clutch comprising a relatively stationary member and a relatively movable member, a lever connected to said movable member, spring means connected to said lever, said spring means tending to press said movable member into engagement with said stationary member, a cylinder, a piston, said piston connected to said lever, a second cylinder in communication with said first cylinder, a second piston in said second cylinder, a spring for said second piston, and a liquid confined between said pistons, and means for relieving the liquid pressure between said pistons.

3. In combination, a clutch having a relatively movable member and a relatively stationary member, a spring for forcing said movable member into engagement with said stationary member, a lever connected to said movable member, a cylinder, a piston therein, said piston being connected to said lever, a second cylinder, a piston in said second cylinder, a spring in contact with said second piston, a liquid confined between said pistons and a by-pass to permit liquid to pass around said first piston at one end of its stroke.

4. In combination, a clutch having a relatively movable and a relatively stationary member, a lever for controlling said movable member, a spring connected to said lever, said spring tending to force said movable member into engagement with said relatively stationary member, a spring for opposing the action of said first spring, a hydraulic compression element between said springs, said second spring equalizing the tension of said first spring when said movable clutch member is on the point of engaging said stationary clutch member, and means for removing said hydraulic element gradually.

5. In combination, a clutch comprising a relatively movable and a relatively stationary member, a spring for moving said movable member into engagement with said stationary member, a hydraulic controller for controlling the action of said spring, said controller having means to neutralize the action of said spring only when said clutch members are upon the point of engagement, and having means for gradually removing said neutralizing action.

6. In combination, a relatively movable clutch element, a relatively stationary clutch element, a spring for moving said movable element into engagement with said stationary member, a pair of cylinders, one having a by-pass, a piston in one of said cylinders connected to said movable element, a check valve in said piston, a second piston in the other cylinder, a spring for said second piston, and a liquid between said pistons.

7. In combination, a cylinder, a piston in said cylinder, a one way valve in said piston for allowing movement of the liquid therethrough, a second cylinder, a second piston therein, said pistons having a liquid confined between them, clutch actuating means acting on said first piston, a spring tending to move the second piston toward the first piston and a by pass around said first piston.

8. In combination, a cylinder, a piston therein, said cylinder having a by pass at the end of the stroke of the piston, a second cylinder communicating with said first cylinder, a piston in said second cylinder, a check valve in said first piston, a body of fluid between said pistons, and a spring compressed by said second piston and adapted to move the piston when said by pass is opened.

9. In a device of the class described, the combination of two frictional driving surfaces, means creating a force tending to bring said surfaces into engagement, a second means creating a counter balancing force acting effectively only at the time said surfaces begin to engage to substantially equalize and neutralize the force of said first means, and a third means for gradually dissipating the force of the second means to allow the force of the first means to preponderate.

10. In combination, stationary and movable clutch members adapted to be engaged, a main spring to bring said members relatively adjacent, a spring to neutralize the main spring at the moment of engagement of the members, and means to gradually weaken the second said spring to permit complete action of the main spring.

11. In a device of the class described, the combination of two frictional driving surfaces, means creating a force tending to bring the members into engagement, a second means imposing a graduating counteracting force effective only at the moment of the engagement of the members, and a third means gradually dissipating the counteracting force of the second means to permit complete engagement of the members.

12. In combination, a relatively movable clutch element, a relatively stationary clutch element, a spring for moving said movable element into engagement with said stationary element, a piston connected to said movable element, cylinder means for the piston, a second piston associated with said cylinder means, a spring for second said piston, a liquid between said pistons, and means to by-pass the liquid around said first piston.

13. In a friction clutch, the combination of a plurality of clutch elements, yieldable means for moving said elements into operative engagement, and means offering a continuously varying resistance to the action of said first named means to cause said first named means to have a minimum effect at the time of initial engagement of said clutch elements.

14. In a friction clutch, the combination of a plurality of clutch elements, yieldable means for moving said elements into operative engagement, and means resisting the action of said first named means to reduce the effect of said first named means to a minimum at the time of the initial engagement of said clutch elements, and to permit said first named means to exert its maximum effect at the beginning and end of its clutch closing operation.

In witness whereof, I hereunto subscribe my name this 12th day of November, A. D. 1915.

JAMES S. MANTON.